(12) United States Patent
Li et al.

(10) Patent No.: US 8,534,154 B2
(45) Date of Patent: Sep. 17, 2013

(54) CONNECTING ASSEMBLY AND CLAMP REPLACING APPARATUS USING SAME

(75) Inventors: Shen-Chun Li, Taipei Hsien (TW);
Shou-Kuo Hsu, Taipei Hsien (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 1011 days.

(21) Appl. No.: 12/562,141

(22) Filed: Sep. 18, 2009

(65) Prior Publication Data

US 2011/0023650 A1 Feb. 3, 2011

(30) Foreign Application Priority Data

Jul. 30, 2009 (CN) .......................... 2009 1 0305042

(51) Int. Cl.
*B25J 17/00* (2006.01)

(52) U.S. Cl.
USPC ............... 74/490.05; 74/490.06; 403/348; 403/350; 901/28; 901/46

(58) Field of Classification Search
USPC .............. 74/490.02, 490.05, 490.06; 901/28, 901/29, 31, 46; 403/348, 349, 350; 356/622; 702/150

See application file for complete search history.

(56) References Cited

U.S. PATENT DOCUMENTS

| 6,073,512 A | * | 6/2000 | McCormick et al. ........... 74/528 |
| 2009/0044655 A1 | * | 2/2009 | DeLouis et al. ........... 74/490.05 |
| 2012/0207538 A1 | * | 8/2012 | Rizk .............................. 403/315 |

* cited by examiner

*Primary Examiner* — William C Joyce
(74) *Attorney, Agent, or Firm* — Altis Law Group, Inc.

(57) ABSTRACT

A clamp replacing apparatus includes a robot arm, a clamp and a connecting assembly configured for detachably connecting the clamp to the robot arm. The connecting assembly includes a first rotator and a second rotator. The first rotator is fixed to the robot arm and comprises a number of first locking portions each defining a receiving groove. The second rotator is fixed to the clamp and comprises a number of second locking portions corresponding to the first locking portions and each defining a bolt portion. The bolt portion can be received in the corresponding receiving groove or escaped from the receiving groove.

19 Claims, 4 Drawing Sheets

CONNECTING ASSEMBLY AND CLAMP REPLACING APPARATUS USING SAME

BACKGROUND

1. Technical Field

The present disclosure relates to production replacing apparatuses and, particularly, to a connecting assembly and a clamp replacing apparatus using the same.

2. Description of Related Art

Currently, the operation of replacing a clamp of a robot or a machine, particularly a complicated or heavy clamp, has to be performed by at least two operators using tools such as levers, screw drivers, or other special tools. Detachment of such a clamp and replacement with another clamp will waste a lot of time and lead to low productivity.

Therefore, it is desirable to provide a connecting assembly and a clamp replacing apparatus, which can overcome or at least alleviate the above-mentioned problems.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
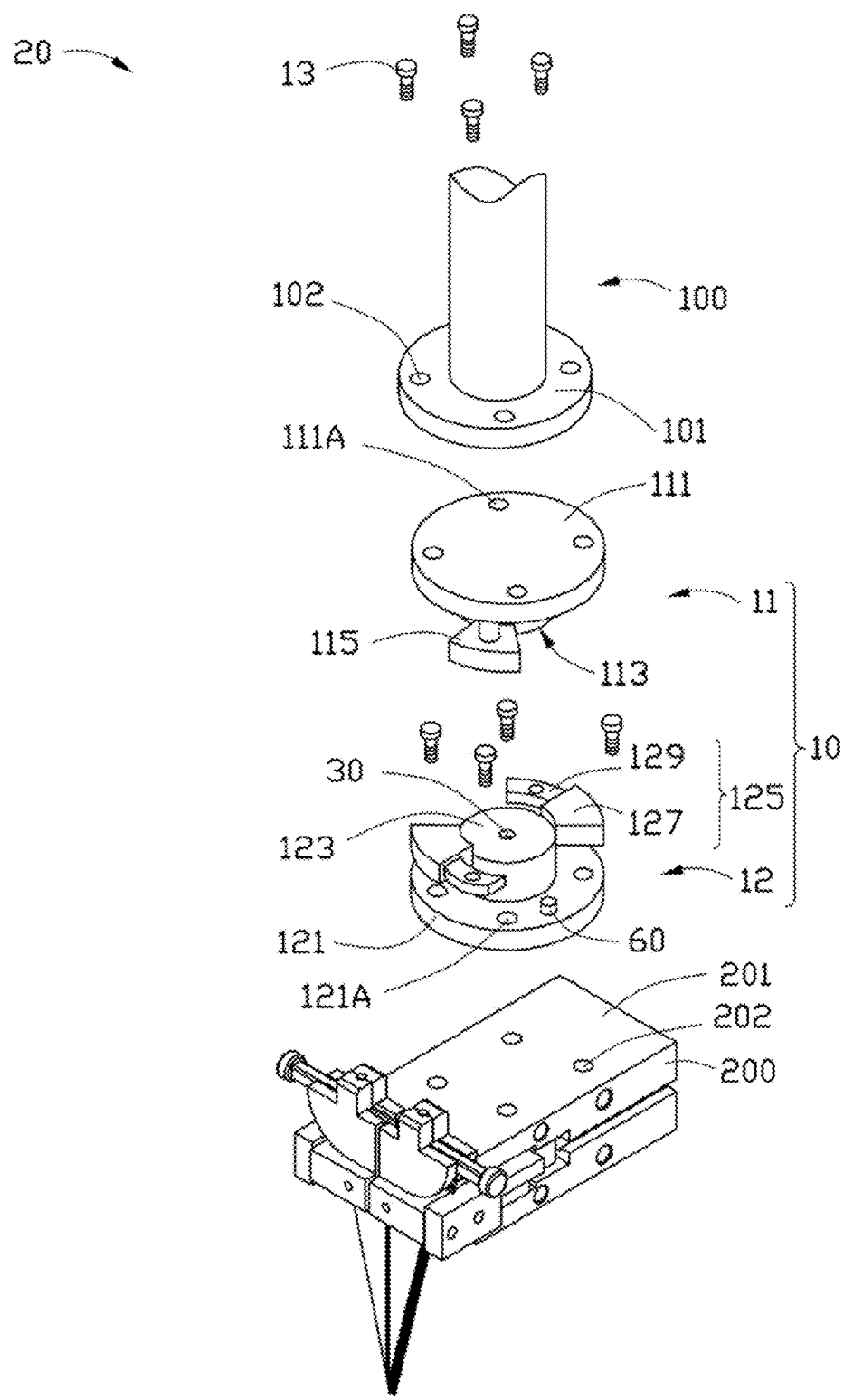
FIG. 1 is an isometric, exploded view of a clamp replacing apparatus, according to an exemplary embodiment.
Figure 2:
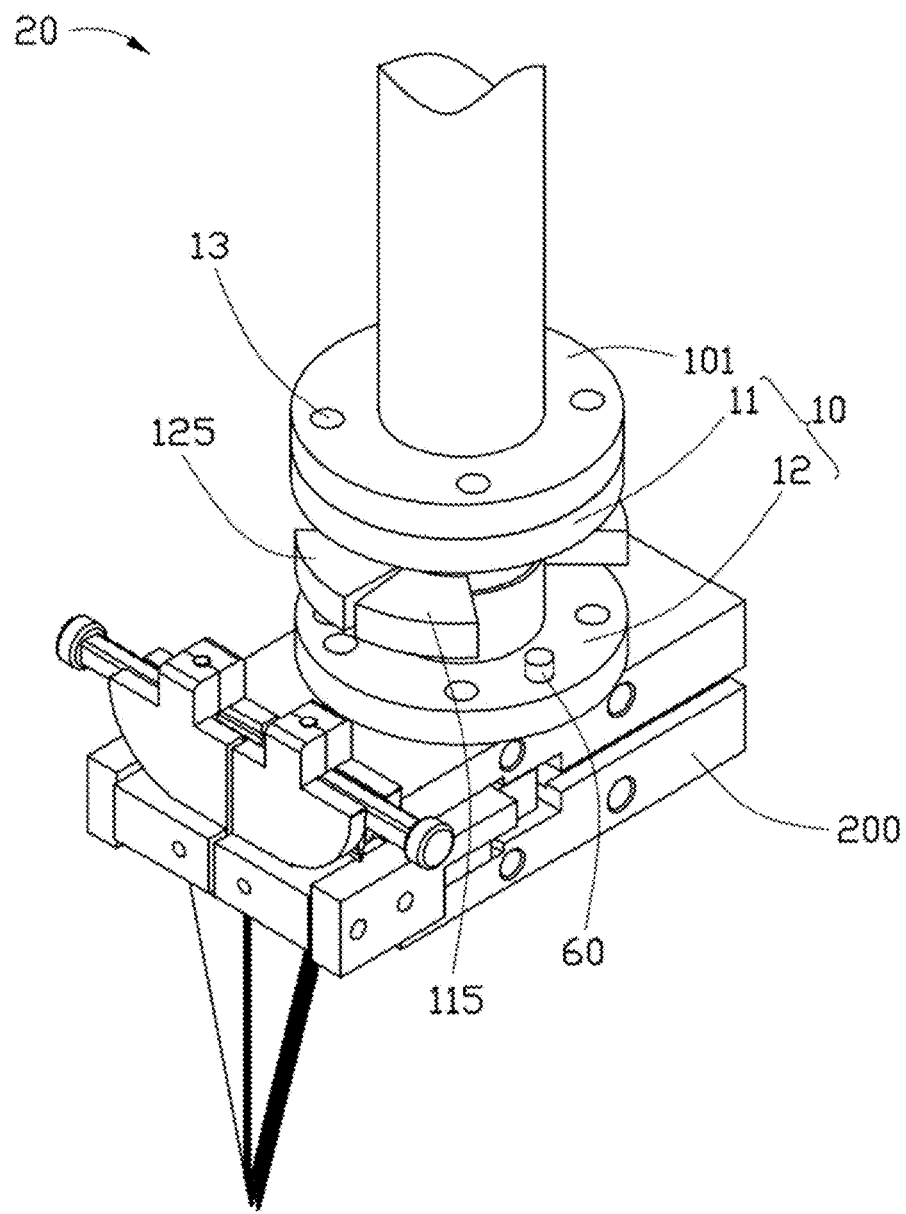
FIG. 2 is an isometric, assembled view of the clamp replacing apparatus of FIG. 1.

Referring to FIGS. 1 and 2, a clamp replacing apparatus 20 includes a robot arm 100, a clamp 200 and a connecting assembly 10 structured between the robot arm 100 and the clamp 200. The connecting assembly 10 is configured for detachably connecting the clamp 200 to the robot arm 100.

The robot arm 100 includes a ring-shaped flange 101 radially extending from a distal end thereof. The flange 101 defines a number of first screw holes 102 thereof. The clamp 200 includes a contacting surface 201 facing the robot arm 100 and a number of second screw holes 202 defined on the contacting surface 201.

The connecting assembly 10 includes a first rotator 11 and a second rotator 12 detachably connected to the first rotator 11. The first rotator 11 is fixed on the flange 101. The second rotator 12 is fixed on the clamp 200.

The first rotator 11 includes a first base 111 contacting with the flange 101 of the robot arm 100 and a first platform 113 formed on an end surface of the first base 111 facing the second rotator 12. The first base 111 defines a number of third screw holes 111A corresponding to the first screw holes 102. A number of first screws 13 are respectively inserted into the first screw holes 102 and the third screw holes 111A for fixing the first rotator 11 to the robot arm 100.

Figure 3:
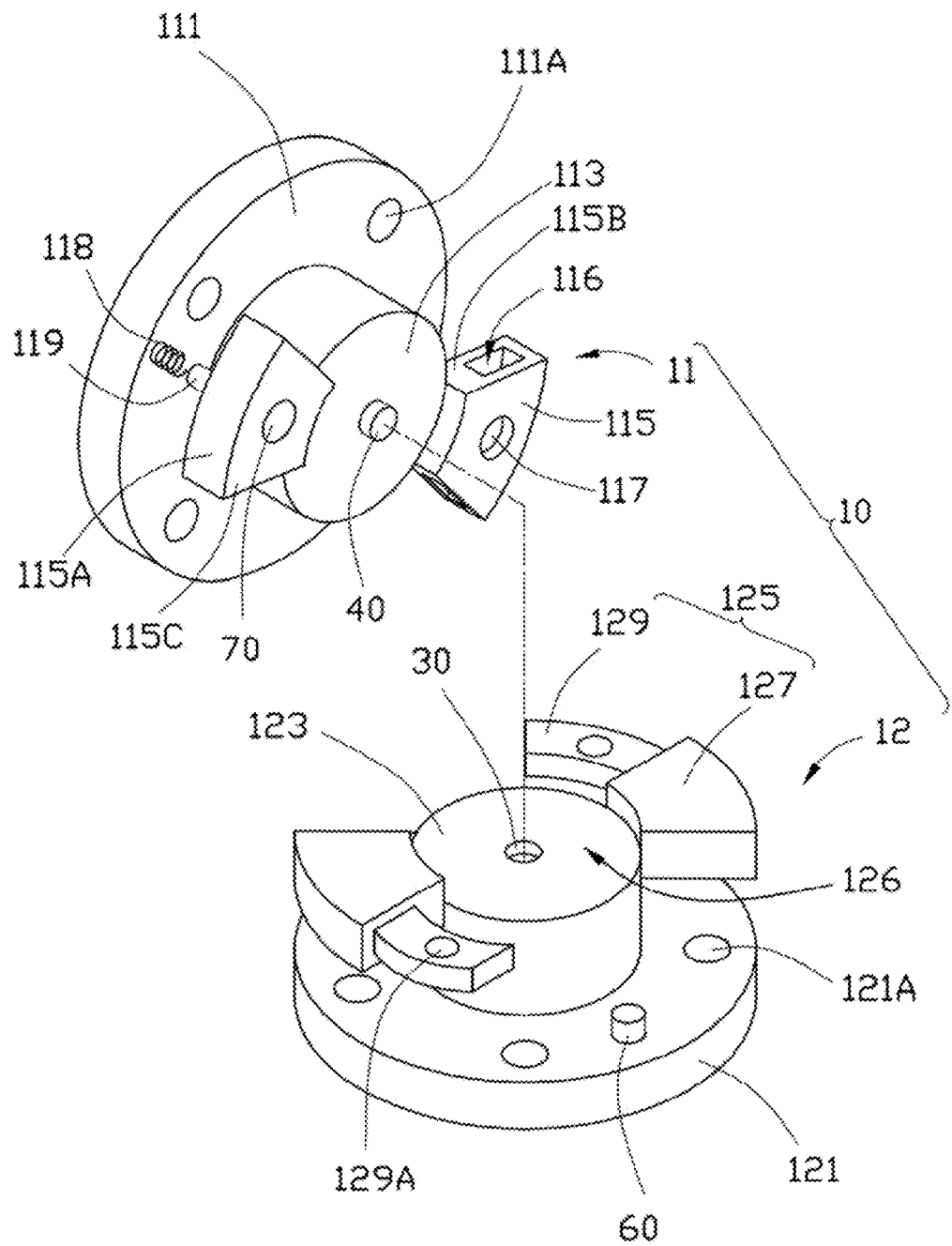
FIG. 3 is an isometric, partially exploded view of a connecting assembly of the clamp replacing apparatus of FIG. 1.

Referring to FIG. 3, the first platform 113 includes two opposite first locking portions 115 radially extending from a circumference surface thereof. Each of the first locking portion 115 has a sector-shaped configuration. The first locking portion 115 includes an arc-shaped outer edge surface 115A, two side surfaces 115B and two end surfaces 115C connecting the arc-shaped edge surface 115A to the side surface 115B. The first locking portion 115 further defines a receiving groove 116 parallel to the arc-shaped outer edge surface 115A and a first through hole 117 perpendicularly communicated with the receiving groove 116 on the end surface 115C facing the second rotator 12.

Corresponding to each first locking portion 115, the first rotator 11 further includes a number of springs 118 fixed on the first base 111 and a number of column bearings 119 respectively connected to the distal ends of the springs 118 corresponding to the first through holes 117. A part of the column bearings 119 is received in the receiving groove 116 by passing through the first through hole 117.

The second rotator 12 includes a second base 121 and a second platform 123 formed on the end surface of the second base 121 facing the first rotator 11. The second base 121 defines a number of fourth screw holes 121A around the second platform 123, corresponding to the second screw holes 202 of the clamp 200. A number of second screws 14 are respectively received in the second screw holes 202 and the fourth screw holes 121A for connecting the second rotator 12 to the clamp 200.

The second platform 123 includes two second locking portions 125 radially extending from a circumference surface thereof, corresponding to the first locking portions 115. A receiving space 126 is defined between the end surface of the second platform 123 and a surface of the two second locking portions 125 for receiving a part of the first platform 113 therein. Each second locking portion 125 includes a fan portion 127 and a bolt portion 129 extending from an end the fan portion 127 towards the receiving groove 116. The diameter and the extending length of the bolt portion 129 are substantially same to that of the receiving groove 116 of the first rotator 11. The bolt portion 129 defines a second through hole 129A corresponding to the first through hole 117. A part of the column bearing 119 is received in the second through hole 129A by passing through the first through hole 117. In this embodiment, both of the first and second locking portions 115, 125 are made of plastic or metal with a high friction coefficient.

Understandably, the number and position of the first and the second locking portions 115, 125 can be designed freely, according to different demands. For example, one of the first locking portion 115 and one of the second locking portion 125 may be disposed on the first platform 113, while the other first locking portion 115 and the other second locking portion 125 are disposed on the second platform 123.

Figure 4:
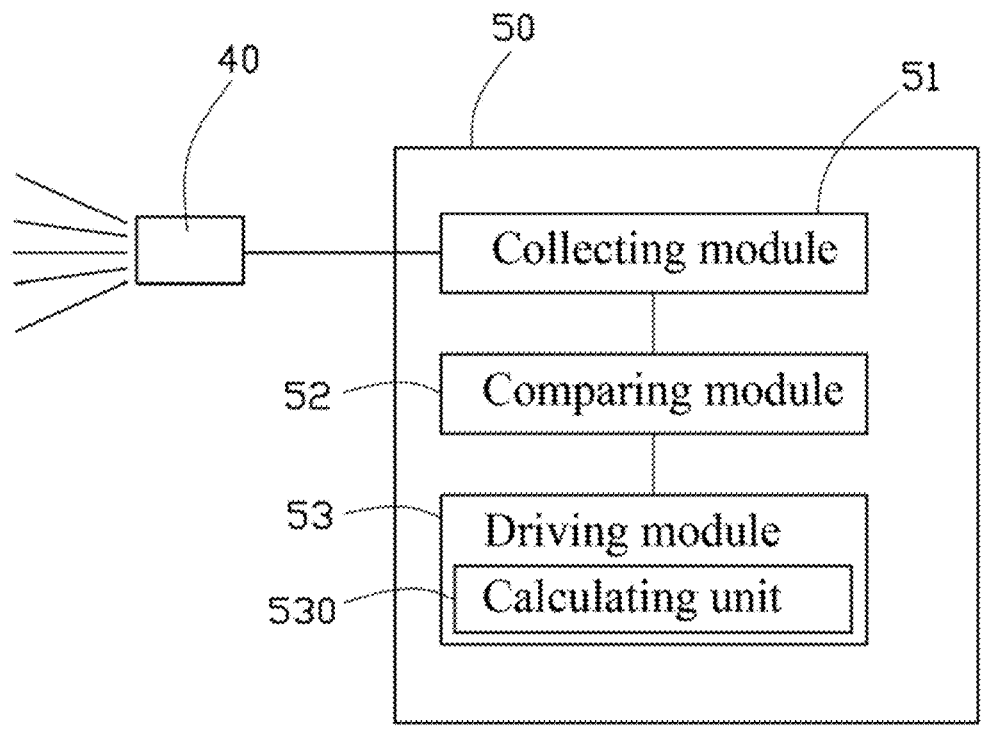
FIG. 4 is a functional block diagram of a controlling circuit of the clamp replacing apparatus of FIG. 1, according to an exemplary embodiment.

Referring to FIG. 4, in order to get an intelligentized clamp replacing apparatus 20, a light emitter 30 is disposed at the center of the second platform 123 to emit a linear ray, a scanning lens 40 is disposed at the center of the first platform 113 and a controlling circuit 50 is integrated in the robot arm 100. The scanning lens 40 is configured for capturing a number of images around the robot arm 100 and installing a three-axis reference system with an x-axis, a y-axis and a z-axis for each image. A first sensor 60 is disposed between the two second locking portions 125 of the second rotator 12, and facing the first rotator 11, to transmit a position signal to the first rotator 11. A second sensor 70 is received in the first through hole 117 of the first locking portion 115 to receive the position signal from the first sensor 60 when the first rotator 11 rotates relative to the second rotator 12.

Referring to FIG. 4, together with FIG. 3, the controlling circuit 50 includes a collecting module 51, a comparing module 52 and a driving module 53.

The collecting module 51 is configured for collecting a number of brightness values corresponding to each pixel in each image and a number of coordinates corresponding to the brightness values.

The comparing module 52 is configured for comparing the brightness values of the images with a predetermined brightness value stored in the comparing module 52.

If one of the brightness values of the images is equal to the predetermined brightness value, the driving module 53 achieves the corresponding coordinate of the brightness value and drives the robot arm 100 to move to the corresponding coordinate, so that the center of the first platform 113 is aiming at the center of the second platform 123. Continuingly, the driving module 53 drives the robot arm 100 to rotate relative to the clamp 200, until the second sensor 70 gets a position signal from the first sensor 60. When the second sensor 70 gets the position signal from the first sensor 60, the robot arm 100 continuingly drives the first rotator 11 to rotate in a predetermined angle stored in the driving module 53, along a direction approaching to the second locking portion 125. As a result, the second locking portion 125 is latched with the first locking portion 115 via the bolt portion 129 being received in the receiving groove 116. Meanwhile, the column bearing 119 of the first rotator 11 is received in the first through hole 117 and the second through hole 129A. In another way, if the brightness values of the images are not equal to the predetermined brightness value, the robot arm 100 is continuingly moved around, and the collecting module 51 continues to collect other images, to find out the clamp 200.

In this embodiment, the driving module 53 further includes a calculating unit 530 configured for calculating a moving distance of the robot arm 100, according to an ordinate origin of the three-axis reference system, an current ordinate position of the robot arm 100 and a predetermined calculating scale stored in the driving module 53.

When in use, people can manually take up the clamp 200 and rotate the second rotator 12 relative to the first rotator 11. As a result, the second rotator 12 can be positioned on the first rotator 11, when the bolt portion 129 is received in the receiving groove 116 of the first rotator 11 and the column bearing 119 of the first rotator 11 is received in the first through hole 117. When replacing the clamp 200, people only need to oppositely rotate the second rotator 12 relative to the first rotator 11, thereby to change a new clamp 200. In this way, the light emitter 30, the scanning lens 40, the first sensor 60, the second sensor 70 and the controlling circuit 50 do not need to work.

In another way for using the clamp replacing apparatus 20, the clamp 200 is firstly fixed on a shelf (not shown). The light emitter 30, the scanning lens 40, the first sensor 60, the second sensor 70 and the controlling circuit 50 are all started. The scanning lens 40 captures a number of images around the robot arm 100 and the comparing module 52 compares the brightness of each pixel of each image, to get a coordinate of the light emitter 30. The driving module 53 drives the robot arm 100 to approach to the light emitter 30, when one of the brightness value of the images is equal to the predetermined brightness value. And as a result, the center of the first platform 113 is aiming at the center of the second platform 125 and the second rotator 12 is latched in the first rotator 11 while the second sensor 70 receives the position signal from the first sensor 60. When replacing the clamp 200, the robot arm 100 oppositely rotates relative to the clamp 200, so that the bolt portion 129 of the second rotator 12 presses the spring 118 of the first rotator 11 and the column bearing 119 is escaped from the first through hole 117 and the second through hole 129A. Thus, the second rotator 12 is disengaged from the first rotator 11 and the robot arm 100 searches another clamp 200 for production.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A connecting assembly for detachably connecting a clamp to a robot arm, comprising:
   a first rotator fixed to the robot arm and comprising a plurality of first locking portions each defining a receiving groove;
   a scanning lens disposed in the center of the first rotator and configured for capturing a plurality of images around the robot arm and installing a three-axis reference system with an x-axis, a y-axis and a z-axis for each image; and
   a second rotator fixed to the clamp and comprising a plurality of second locking portions corresponding to the first locking portions and each defining a bolt portion, the bolt portion can be received in the corresponding receiving groove or escaped from the receiving groove.

2. The connecting assembly in claim 1, wherein the first rotator comprises a first base and a first platform formed on an end surface of the first base and facing the second rotator, the first locking portions are radially extending from a circumference surface of the first platform.

3. The connecting assembly in claim 2, wherein each of the plurality of first locking portions comprises an arc-shaped outer edge surface, two side surfaces and two end surfaces connecting the arc-shaped edge surface to the side surface of the first platform, the receiving groove is defined parallel to the arc-shaped outer edge surface and a first through hole is perpendicularly communicated to the receiving groove on one of the end surfaces facing the second rotator.

4. The connecting assembly in claim 3, wherein, corresponding to each first locking portion, the first rotator further comprises a plurality of springs fixed on the first base and a plurality of column bearing respectively connected to the distal ends of the springs corresponding to the first through holes.

5. The connecting assembly in claim 4, wherein each second locking portion comprises a fan portion and the bolt portion extending from an end of the fan portion towards the receiving groove.

6. The connecting assembly in claim 5, wherein the bolt portion defines a second through hole corresponding to the first through hole, a part of the column bearing is received in the second through hole by passing through the first through hole.

7. The connecting assembly in claim 2, wherein the second rotator comprises a second base and a second platform formed on an end of the second base facing the first rotator.

8. The connecting assembly in claim 7, wherein a receiving space is defined between an end surface of the second platform and end surfaces of the plurality of second locking portions for receiving a part of the first platform therein.

9. The connecting assembly in claim 1, wherein each of the plurality of first locking portions has a sector-shaped configuration.

10. The connecting assembly in claim 1, wherein both of the first and second locking portions are made of plastic or metal with a high friction coefficiency.

11. A clamp replacing apparatus comprising:
   a robot arm,
   a clamp; and
   a connecting assembly for detachably connecting the clamp to the robot arm, comprising:
   a first rotator fixed to the robot arm and comprising a plurality of first locking portions each defining a receiving groove;
   a scanning lens disposed in the center of the first rotator and configured for capturing a plurality of images around the robot arm and installing a three-axis reference system with an x-axis, a y-axis and a z-axis for each image; and
   a second rotator fixed to the clamp and comprising a plurality of second locking portions corresponding to the first locking portions and each defining a bolt portion, the bolt portion can be received in the corresponding receiving groove or escaped from the receiving groove.

12. The clamp replacing apparatus in claim 11, wherein the robot arm comprises a flange radially extending from a distal end thereof and a plurality of first screw holes on the flange, the first rotator defines a plurality of third screw holes corresponding to the first screw holes, a plurality of first screws are respectively extended into the first screw holes and the third screw holes for fixing the first rotator to the robot arm.

13. The clamp replacing apparatus in claim 11, wherein the clamp defines a plurality of second screw holes, the second rotator defines a plurality of fourth screw holes corresponding to the second screw holes, a plurality of second screws are respectively received in the second screw holes and the fourth screw holes for fixing the second rotator to the clamp.

14. The clamp replacing apparatus in claim 11, further comprising a light emitter disposed at the center of the second rotator configured for emitting a linear ray.

15. The clamp replacing apparatus in claim 11, wherein a first sensor is disposed between two adjacent second locking portions and is configured for transmitting a position signal, a second sensor is disposed on one of the first locking portion for receiving the position signal from the first sensor when the first rotator rotate relative to the second rotator.

16. The clamp replacing apparatus in claim 11, further comprising a controlling circuit comprising:
   a collecting module configured for collecting a plurality of brightness values corresponding to each pixel of the images and a plurality of coordinates corresponding to the brightness values;
   a comparing module configured for comparing the brightness values of the images with a predetermined brightness value stored therein; and
   a driving module configured for achieving the corresponding coordinate of the brightness value and drives the robot arm to move to the corresponding coordinate and rotate relative to the clamp, until the second sensor gets a position signal from the first sensor, when the brightness values of the images is equal to the predetermined brightness value.

17. The clamp replacing apparatus in claim 16, wherein if the brightness values of the images are not equal to the predetermined brightness value, the robot arm moves away and the collecting module continues to collect other images.

18. The clamp replacing apparatus in claim 16, wherein the driving module further comprises a calculating unit configured for calculating a moving distance for the robot arm, according to an ordinate origin of the three-axis reference system, an current ordinate position of the robot arm and a predetermined calculating scale.

19. A clamp replacing apparatus comprising:
   a clamp; and
   a connecting assembly for detachably connecting the clamp to the robot arm, comprising:
   a first rotator fixed to the robot arm and comprising a plurality of first locking portions each defining a receiving groove;
   a second rotator fixed to the clamp and comprising a plurality of second locking portions corresponding to the first locking portions and each defining a bolt portion, the bolt portion can be received in the corresponding receiving groove or escaped from the receiving groove; and
   a light emitter disposed at the center of the second rotator configured for emitting a linear ray.

* * * * *